(12) United States Patent
Hu et al.

(10) Patent No.: US 11,567,291 B2
(45) Date of Patent: Jan. 31, 2023

(54) OPTICAL SYSTEM

(71) Applicant: TDK TAIWAN CORP., Taoyuan (TW)

(72) Inventors: Chao-Chang Hu, Taoyuan (TW); Che-Wei Chang, Taoyuan (TW); Chih-Wen Chiang, Taoyuan (TW); Chen-Er Hsu, Taoyuan (TW); Fu-Yuan Wu, Taoyuan (TW); Shou-Jen Liu, Taoyuan (TW); Chih-Wei Weng, Taoyuan (TW); Mao-Kuo Hsu, Taoyuan (TW); Hsueh-Ju Lu, Taoyuan (TW); Che-Hsiang Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 348 days.

(21) Appl. No.: 16/729,127

(22) Filed: Dec. 27, 2019

(65) Prior Publication Data

US 2020/0209516 A1     Jul. 2, 2020

Related U.S. Application Data

(60) Provisional application No. 62/785,593, filed on Dec. 27, 2018.

(30) Foreign Application Priority Data

Dec. 20, 2019   (EP) ..................... 19218902

(51) Int. Cl.
*G02B 7/09* (2021.01)
*G02B 3/12* (2006.01)
(Continued)

(52) U.S. Cl.
CPC ............... *G02B 7/09* (2013.01); *G02B 3/12* (2013.01); *G02B 7/023* (2013.01); *G02B 7/1828* (2013.01); *G02B 26/004* (2013.01); *G02B 27/646* (2013.01); *G03B 3/10* (2013.01); *G03B 5/00* (2013.01); *G03B 5/02* (2013.01);
(Continued)

(58) Field of Classification Search
CPC .. G02B 26/004; G02B 26/08; G02B 26/0875; G02B 3/12; G02B 3/14; G02B 7/09; G02B 7/023; G02B 27/64; G02B 27/646; G02B 1/11; G03B 5/00; G03B 13/36; G03B 2205/00; G03B 2205/0007;
(Continued)

(56) References Cited

U.S. PATENT DOCUMENTS

2019/0104239 A1* 4/2019 Aschwanden ....... H04N 5/2254
2019/0141224 A1* 5/2019 Park ................. H01L 27/14618
2020/0124839 A1* 4/2020 Aschwanden ....... G02B 27/646

* cited by examiner

*Primary Examiner* — Marin Pichler
(74) *Attorney, Agent, or Firm* — Muncy, Geissler, Olds & Lowe, P.C.

(57) ABSTRACT

An optical system is provided and includes a fixed assembly, a movable element, a movable assembly, a driving module and a stopping assembly. The fixed assembly defines a main axis. The movable element is movable relative to the fixed assembly and is connected to a first optical element. The movable assembly is connected to the movable element. The driving module is configured to drive the movable assembly so as to drive the movable element to move relative to the fixed assembly. The stopping assembly is configured to limit the range of motion of the movable element.

24 Claims, 17 Drawing Sheets

(51) Int. Cl.
*G02B 26/00* (2006.01)
*G02B 27/64* (2006.01)
*G03B 13/36* (2021.01)
*G03B 5/00* (2021.01)
*G02B 7/182* (2021.01)
*G02B 7/02* (2021.01)
*H04N 5/225* (2006.01)
*H04N 5/232* (2006.01)
*G03B 5/02* (2021.01)
*G03B 3/10* (2021.01)

(52) U.S. Cl.
CPC ........... *G03B 13/36* (2013.01); *H04N 5/2257* (2013.01); *H04N 5/23258* (2013.01); *H04N 5/23287* (2013.01); *G03B 2205/0007* (2013.01); *G03B 2205/0015* (2013.01); *G03B 2205/0069* (2013.01)

(58) Field of Classification Search
CPC .... G03B 2205/0015; G03B 2205/0023; G03B 2205/0069; H02K 41/0354
USPC ................................. 359/554, 557, 228, 665
See application file for complete search history.

OPTICAL SYSTEM

CROSS REFERENCE TO RELATED APPLICATIONS

This application claims the benefit of U.S. Provisional Application No. 62/785,593, filed Dec. 27, 2018, and European Patent Application No. 19218902.5, filed Dec. 20, 2019, the entirety of which are incorporated by reference herein.

BACKGROUND OF THE DISCLOSURE

Field of the Disclosure

The present disclosure relates to an optical system, and in particular it relates to an optical system having a liquid lens.

Description of the Related Art

As technology has progressed, many kinds of electronic devices such as smartphones have begun to include the functionality of digital photography or video recording. A user can operate an electronic device to capture various images with a camera module that is included in the electronic device.

The design trend of today's electronic devices is toward miniaturization, meaning that the various components of a camera module or its structure must also be continuously reduced, so as to achieve the purpose of miniaturization. In general, a driving mechanism in a camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can perform autofocus, optical image stabilization, and miniaturization at the same time is a topic nowadays that needs to be discussed and solved.

BRIEF SUMMARY OF THE DISCLOSURE

Accordingly, one objective of the present disclosure is to provide an optical system (a camera module) to solve the above problems.

According to some embodiments of the disclosure, an optical system is provided and includes a fixed assembly, a movable element, a movable assembly, a driving module and a stopping assembly. The fixed assembly defines a main axis. The movable element is movable relative to the fixed assembly and is connected to a first optical element. The movable assembly is connected to the movable element. The driving module is configured to drive the movable assembly so as to drive the movable element to move relative to the fixed assembly. The stopping assembly is configured to limit the range of motion of the movable element.

According to some embodiments, the fixed assembly includes a casing, the stopping assembly includes fewer than three first stopping members, disposed on the movable assembly, and the first stopping members only correspond to a sidewall of the casing.

According to some embodiments, when viewed along the main axis, the first stopping members partially overlap the driving module.

According to some embodiments, when viewed along the main axis, the sidewall does not overlap the first stopping members.

According to some embodiments, the fixed assembly includes a base, the stopping assembly further includes fewer than three second stopping members, and all of the second stopping members are disposed on a side of the movable assembly and face the base.

According to some embodiments, the stopping assembly further includes a third stopping member, disposed on the movable assembly, the driving module includes a driving magnet and a driving coil corresponding to the driving magnet, the driving coil surrounds the third stopping member, wherein a distance between the third stopping member and the driving magnet in a first direction is smaller than a distance between the driving coil and the driving magnet.

According to some embodiments, the optical system further includes glue disposed on the third stopping member, and the glue is configured to be adhered to the driving coil and the movable assembly.

According to some embodiments, a protruding pillar is formed on the base, the stopping assembly further includes a fourth stopping member extending along a first axis and disposed on the movable assembly, and the protruding pillar is configured to block the fourth stopping member, thereby preventing the movable assembly from rotating around the main axis or moving along the first axis or a second axis.

According to some embodiments, when viewed along the main axis, the protruding pillar is located between the driving module and the main axis.

According to some embodiments, the optical system further includes glue which is disposed between the protruding pillar and the movable assembly.

According to some embodiments, the movable assembly has a first surface and a second surface, the first surface and the second surface are connected to a corner, a first contact surface of the glue contacts the first surface, and a second contact surface of the glue contacts the second surface.

According to some embodiments, the movable assembly has a first surface, the protruding pillar has a third surface, a first contact surface of the glue contacts the first surface, and a third contact surface of the glue is configured to contact the third surface, wherein the movable assembly is configured to move between an upper limit position and a lower limit position along the main axis, and the glue is disposed between the upper limit position and the lower limit position.

According to some embodiments, when the movable assembly is located at the upper limit position, a distance between the first contact surface and the casing along the main axis is less than a distance between the third contact surface and the casing along the main axis.

According to some embodiments, when the movable assembly is located at the lower limit position, a distance between the first contact surface and the casing along the main axis is less than a distance between the third contact surface and the casing along the main axis.

According to some embodiments, the stopping assembly further includes a fifth stopping member, which is disposed on the movable assembly and faces the casing, and a protruding portion is formed on the protruding pillar and is configured to block the fifth stopping member, thereby preventing the movable assembly from rotating around the second axis.

According to some embodiments, a distance between the protruding portion and the casing along the main axis is smaller than a distance between the fifth stopping member and the casing.

According to some embodiments, the stopping assembly further includes a sixth stopping member, which is disposed on the movable assembly and faces the base, and the protruding pillar is configured to block the sixth stopping member, thereby preventing the movable assembly from rotating around the second axis.

According to some embodiments, when viewed along the main axis, the fifth stopping member partially overlaps the sixth stopping member.

According to some embodiments, the casing has a first top surface, and when viewed along the main axis, the first top surface does not overlap the driving module.

According to some embodiments, the movable assembly includes a first movable member, disposed along a second axis; and a second movable member, disposed along a first axis, wherein the second movable member is adjacent to the first movable member, and the second movable member is configured to block the first movable member from moving along the first axis.

According to some embodiments, the optical system further includes a plurality of pieces of glue, which are disposed between the first movable member and the second movable member.

According to some embodiments, the optical system further includes an elastic element and at least one piece of glue, the elastic element is connected to the fixed assembly, the elastic element includes a first string arm and a second string arm, which are respectively connected to the first movable member and the second movable member, and the at least one piece of glue is disposed between the first string arm and the second string arm.

According to some embodiments, the fixed assembly includes a protruding pillar, and an avoiding groove corresponding to the first string arm and the second string arm is formed on the protruding pillar.

According to some embodiments, a receiving groove is formed on the protruding pillar, and the optical system further includes an adhesive element which is disposed in the receiving groove and is configured to be adhered to the protruding pillar, the elastic element and the casing.

According to some embodiments, the optical system further includes an elastic element and a piece of glue, and the glue is disposed between the elastic element and the movable assembly.

According to some embodiments, the optical system further includes another piece of glue, which is disposed between the elastic element and the fixed assembly.

The present disclosure provides an optical system having a first optical element, a deforming member, a movable element, a fixed assembly, a connecting assembly, a movable assembly, and a driving module. The movable element is configured to be connected to the first optical element through the deforming member, and the movable assembly is connected to the movable element through the connecting assembly. When driving module is configured to drive movable assembly to move relative to fixed assembly, the movable element can be moved to drive the deforming member to push the bottom of first optical element, thereby changing the optical properties of the liquid lens element.

In addition, the optical system of the present disclosure may include a plurality of pieces of glue, and the glue may serve as a buffering element, disposed between a stopping member and a driving coil, between two adjacent movable members, between a movable member and the protruding column, between the elastic element and the movable assembly, or between the elastic element and the fixed assembly, so as to prevent the elements in the optical system from the damage caused by collision.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
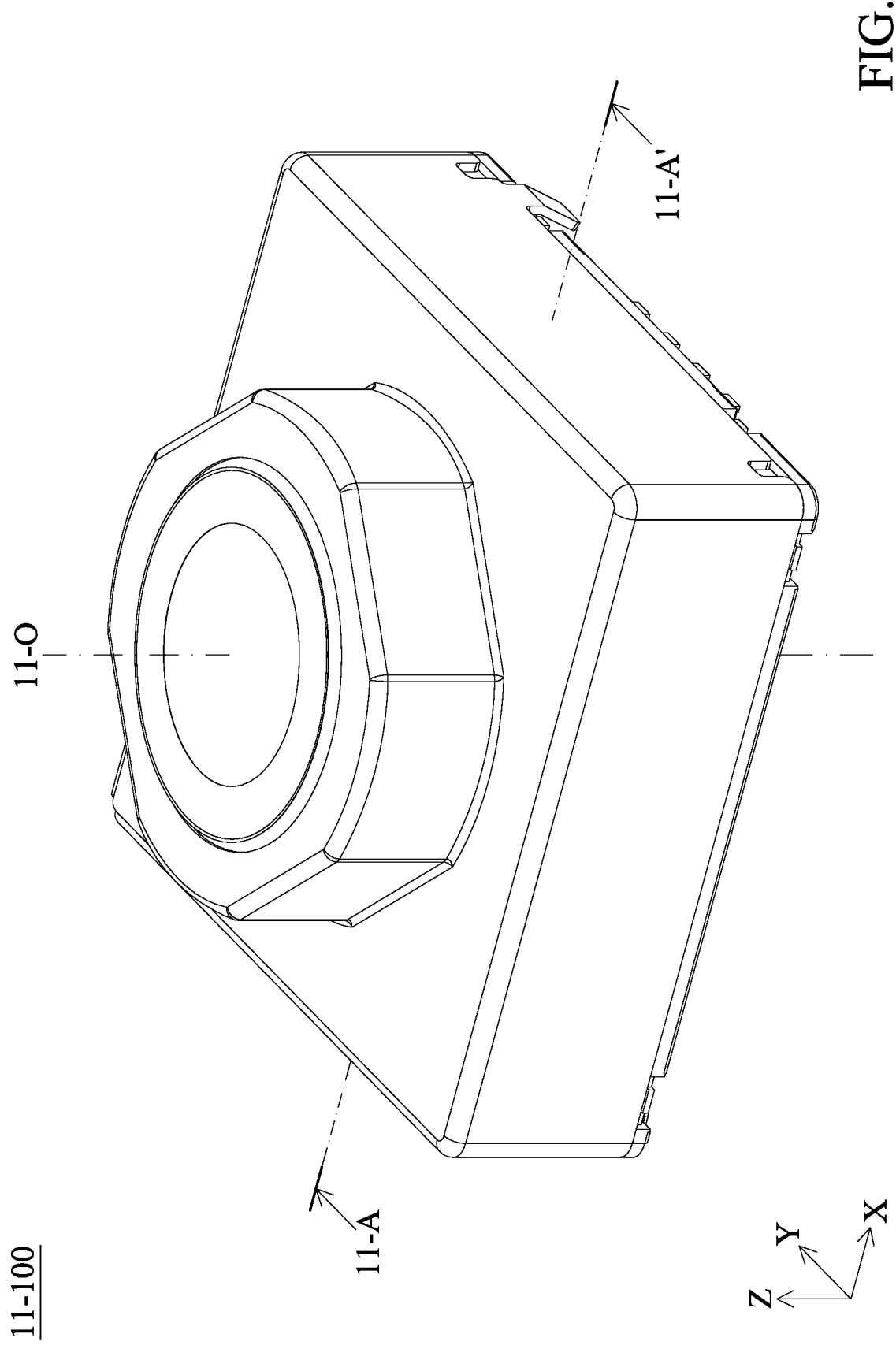
FIG. 1 is a schematic diagram of an optical system 11-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
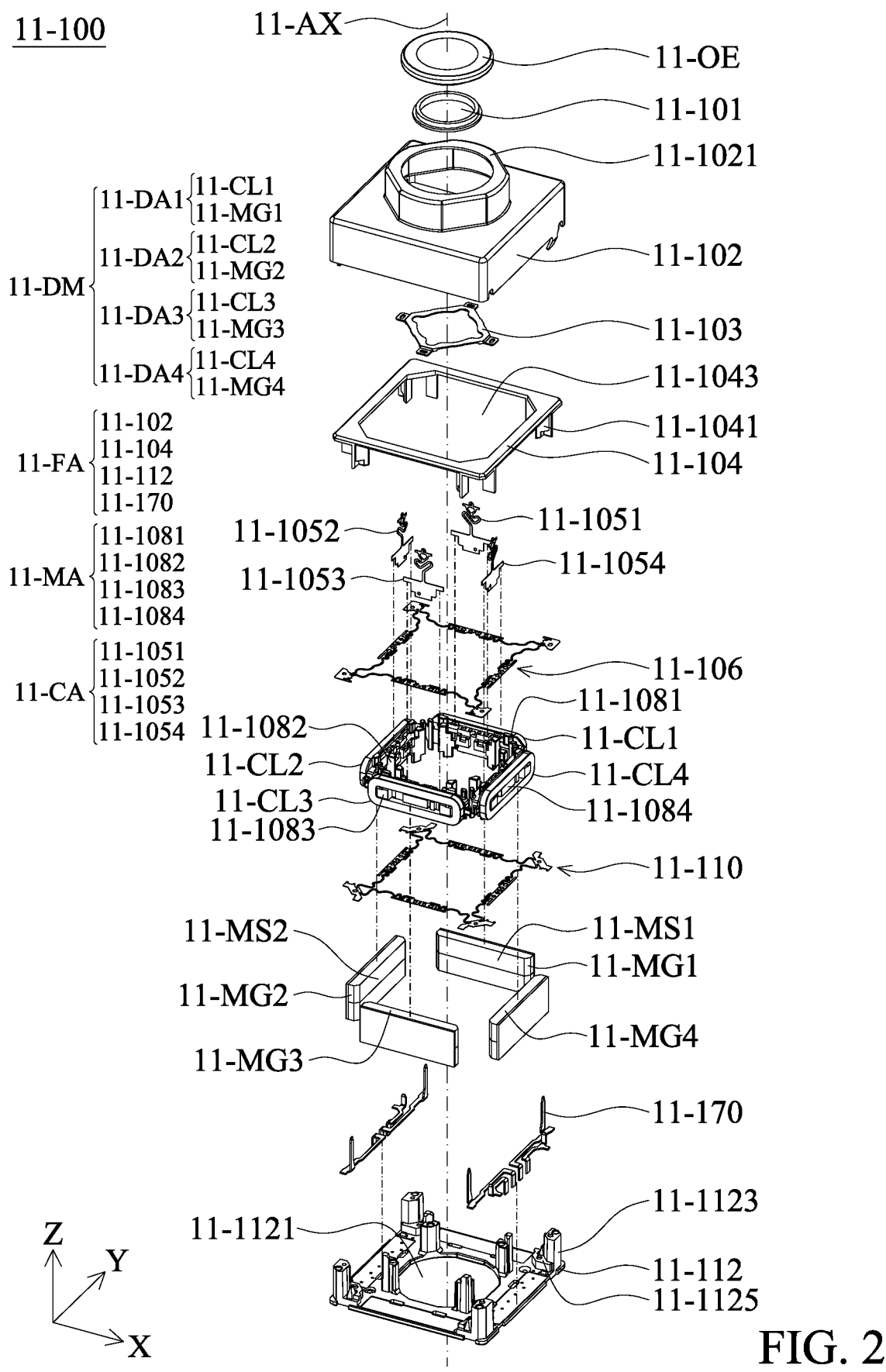
FIG. 2 is an exploded diagram of an optical system 11-100 according to an embodiment of the present disclosure.
Figure 3:
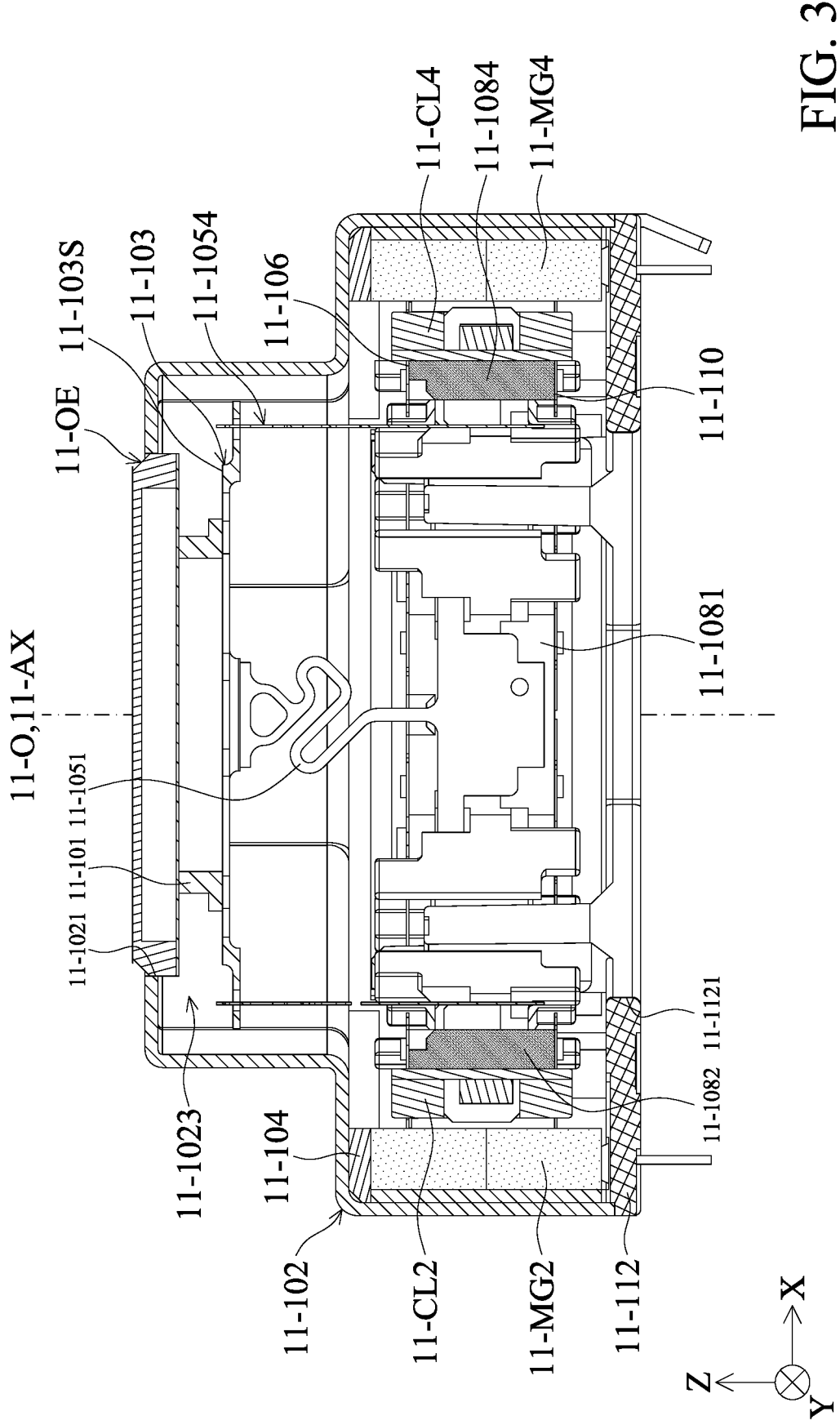
FIG. 3 is a cross-sectional view of the optical system 11-100 along line (11-A)-(11-A') in FIG. 1 according to an embodiment of the present disclosure.

Please refer to FIG. 1 to FIG. 3. FIG. 1 is a schematic diagram of an optical system 11-100 according to an embodiment of the present disclosure, FIG. 2 is an exploded diagram of an optical system 11-100 according to an embodiment of the present disclosure, and FIG. 3 is a cross-sectional view of the optical system 11-100 along line (11-A)-(11-A') in FIG. 1 according to an embodiment of the present disclosure. The optical system 11-100 can be an optical camera system and can be configured to hold and drive a first optical element 11-OE, and the first optical element 11-OE may define an optical axis 11-O. The optical system 11-100 can be installed in different electronic devices or portable electronic devices, such as a smartphone, for allowing a user to perform the image capturing function. In this embodiment, the optical system 11-100 can be a voice coil motor (VCM) with an auto-focusing (AF) function, but it is not limited thereto. In other embodiments, the optical system 11-100 can also perform the functions of auto-focusing and optical image stabilization (OIS).

As shown in FIG. 2, in this embodiment, the optical system 11-100 may include a fixed assembly 11-FA, a deforming member 11-101, a movable element 11-103, and a connecting assembly 11-CA, a movable assembly 11-MA and a driving module 11-DM. The deforming member 11-101 is connected between the movable element 11-103 and the first optical element 11-OE, the movable element 11-103 is movable relative to the fixed assembly 11-FA, and the driving module 11-DM is configured to drive the movable element 11-103 to move relative to the fixed assembly 11-FA. Specifically, the movable assembly 11-MA is movably connected to the movable element 11-103 via the connecting assembly 11-CA, and the driving module 11-DM drives the movable assembly 11-MA to move relative to the fixed assembly 11-FA, thereby driving the movable element 11-103.

In this embodiment, as shown in FIG. 2 and FIG. 3, the fixed assembly 11-FA includes a casing 11-102, a frame 11-104, and a base 11-112. The casing 11-102 is fixedly connected to the base 11-112, and the frame 11-104 can also be fixedly connected to the inner wall surface of the casing 11-102. A main axis 11-AX can be defined by the fixed assembly 11-FA. When the optical system 11-100 is not activated, the main axis 11-AX is parallel to or overlaps an optical axis 11-O of the first optical element 11-OE. In addition, the movable element 11-103 has a movable element surface 11-103S which faces the first optical element 11-OE.

As shown in FIG. 2 and FIG. 3, the aforementioned casing 11-102 has a hollow structure, and a casing opening 11-1021 is formed thereon. A base opening 11-1121 is formed on the base 11-112, The center of the casing opening 11-1021 corresponds to the optical axis 11-O of the first optical element 11-OE, and the base opening 11-1121 corresponds to a photosensitive element (not shown in the figure) disposed below the base 11-112. In this embodiment, the first optical element 11-OE is fixedly disposed in the casing opening 11-1021. The external light can enter the casing 11-102 through the first optical element 11-OE and then is received by the aforementioned photosensitive element after passing through the base opening 11-1121 so as to generate a digital image signal.

Furthermore, the casing 11-102 is disposed on the base 11-112 and may have an accommodating space 11-1023 configured to accommodate the movable element 11-103, the frame 11-104, and the movable assembly 11-MA, the connecting assembly 11-CA, and the driving module 11-DM.

As shown in FIG. 2 and FIG. 3, in this embodiment, the movable assembly 11-MA may include four movable members (a first movable member 11-1081, a second movable member 11-1082, and a third movable member 11-1083 and a fourth movable member 11-1084), and the connecting assembly 11-CA may include four connecting members (a first connecting member 11-1051, a second connecting member 11-1052, a third connecting member 11-1053, and a fourth connecting member 11-1054). The first movable member 11-1081 to the fourth movable member 11-1084 are connected to the movable element 11-103 by the first connecting member 11-1051 to the fourth connecting member 11-1054, respectively.

In addition, the optical system 11-100 may further include a first elastic element 11-106 and a second elastic element 11-110, and the base 11-112 may include four protruding columns 11-1123. The outer portion (the outer ring portion) of the first elastic element 11-106 is fixedly disposed on the top surfaces of the protruding columns 11-1123, the outer portion (the outer ring portion) of the second elastic element 11-110 is fixedly disposed on a plane 11-1125 of each of the protruding columns 11-1123, and the inner portions (the inner ring portions) of the first elastic element 11-106 and the second elastic element 11-110 are respectively connected to the upper and lower sides of the movable assembly 11-MA so that the first movable member 11-1081 to the fourth movable member 11-1084 are suspended in the accommodating space 11-1023.

In this embodiment, the driving module 11-DM may include four driving assemblies (a first driving assembly 11-DA1, a second driving assembly 11-DA2, a third driving assembly 11-DA3, and a fourth driving assembly 11-DA4). The first driving assembly 11-DA1 includes a first driving coil 11-CL1 and a first magnetic element 11-MG1, and the second driving assembly 11-DA2 includes a second driving coil 11-CL2 and a second magnetic element 11-MG2, the third driving assembly 11-DA3 includes a third driving coil 11-CL3 and a third magnetic element 11-MG3, and the fourth driving assembly 11-DA4 includes a fourth driving coil 11-CL4 and a fourth magnetic element 11-MG4.

In this embodiment, each magnetic element has a magnetic surface. For example, as shown in FIG. 2, the first magnetic element 11-MG1 and the second magnetic element 11-MG2 respectively have a first magnetic surface 11-MS1 and a second magnetic surface 11-MS2, the first magnetic surface 11-MS1 faces the first driving coil 11-CL1, the second magnetic surface 11-MS2 faces the second driving coil 11-CL2, and the first magnetic surface 11-MS1 and the second magnetic surface 11-MS2 face different directions.

In this embodiment, as shown in FIG. 2, the frame 11-104 has a plurality of grooves 11-1041 and a central opening 11-1043. In this embodiment, the frame 11-104 has four grooves 11-1041 configured to receive the four magnetic elements, but the number of the grooves 11-1041 and the magnetic elements is not limited to this embodiment. The central opening 11-1043 is configured to accommodate the first driving coil 11-CL1 to the fourth driving coil 11-CL4 and the first movable member 11-1081 to the fourth movable member 11-1084.

In this embodiment, the first driving coil 11-CL1 to the fourth driving coil 11-CL4 may be winding coils, which are respectively disposed on the first movable member 11-1081 to the fourth movable member 11-1084, and when the first driving coil 11-CL1 to the fourth driving coil 11-CL4 are provided with electricity, they can respectively act with the first magnetic element 11-MG1 to the fourth magnetic element 11-MG4 to generate an electromagnetic driving force to drive at least one of the first movable member 11-1081 to the fourth movable member 11-1084 to move relative to the base 11-112 and the frame 11-104 along the optical axis 11-O (the Z-axis) so as to perform functions of auto focusing or optical image stabilization.

The driving assembly of the driving module 11-DM can actuate individually or cooperatively. For example, the first driving assembly 11-DA1 is configured to drive the first movable member 11-1081 to move relative to the fixed assembly 11-FA, and the second driving assembly 11-DA2 is configured to drive the second movable member 11-1082 to move relative to the fixed assembly 11-FA and the first movable member 11-1081, and so on.

Furthermore, as shown in FIG. 2, in this embodiment, the fixed assembly 11-FA may further include at least one circuit member 11-170 configured to be electrically connected to the driving module 11-DM through the first elastic element 11-106 or the second elastic element 11-110. The circuit member 11-170 may be implemented by insert molding technology, but it is not limited thereto.

Figure 4:
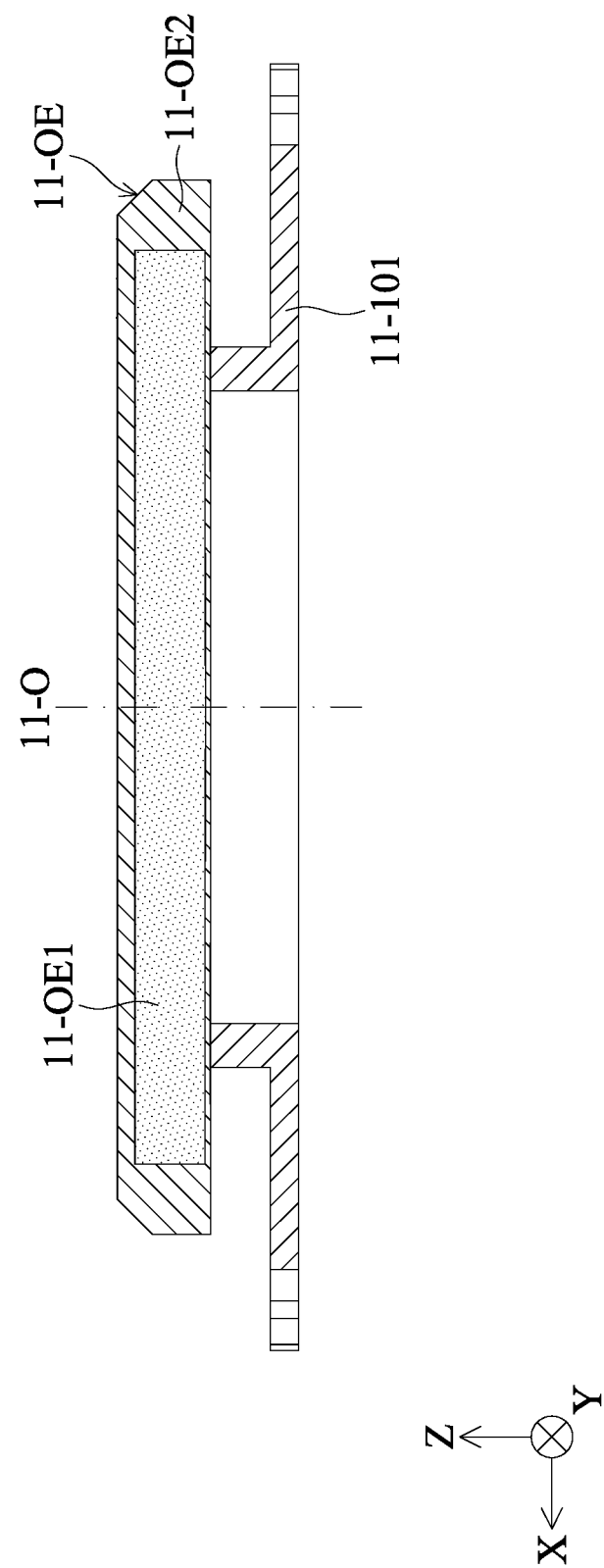
FIG. 4 is a schematic diagram illustrating that the first optical element 11-OE is not pushed by the deforming member 11-101 according to an embodiment of the present disclosure.
Figure 5:
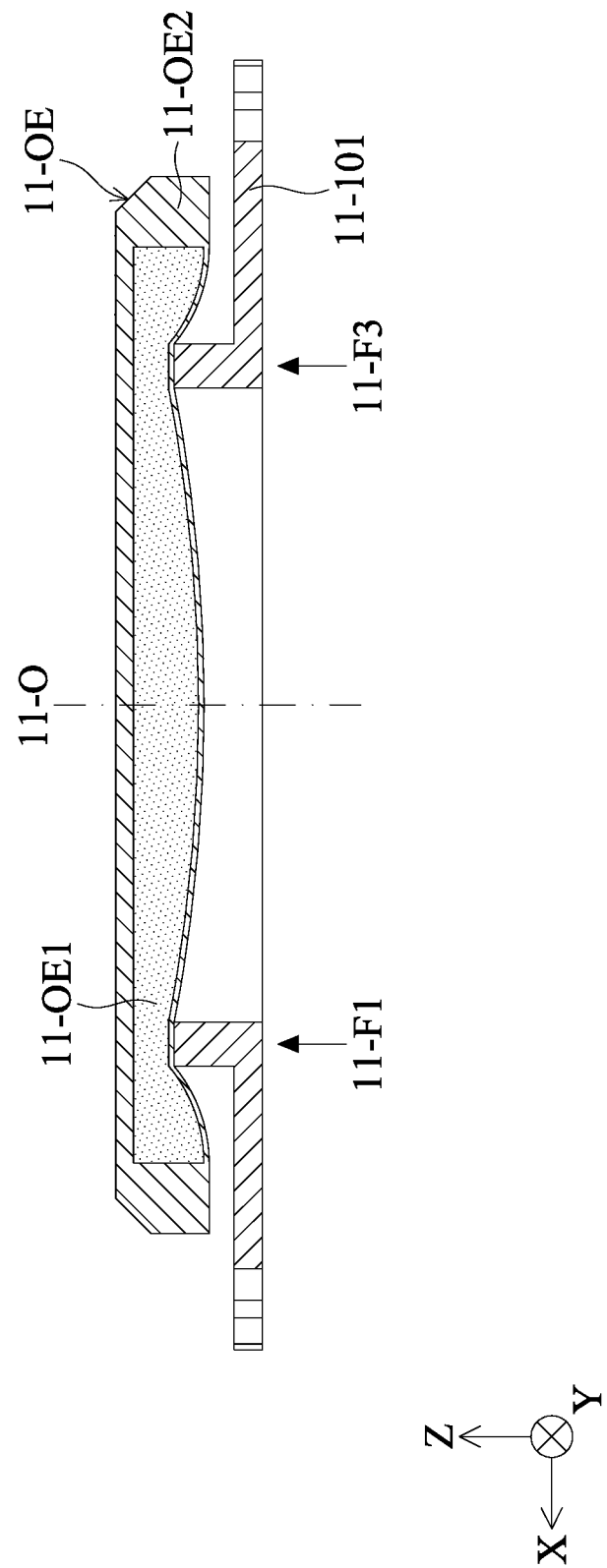
FIG. 5 and FIG. 6 are schematic diagrams of the first optical element 11-OE after being pushed by the deforming member 11-101 according to an embodiment of the present disclosure.
Figure 6:
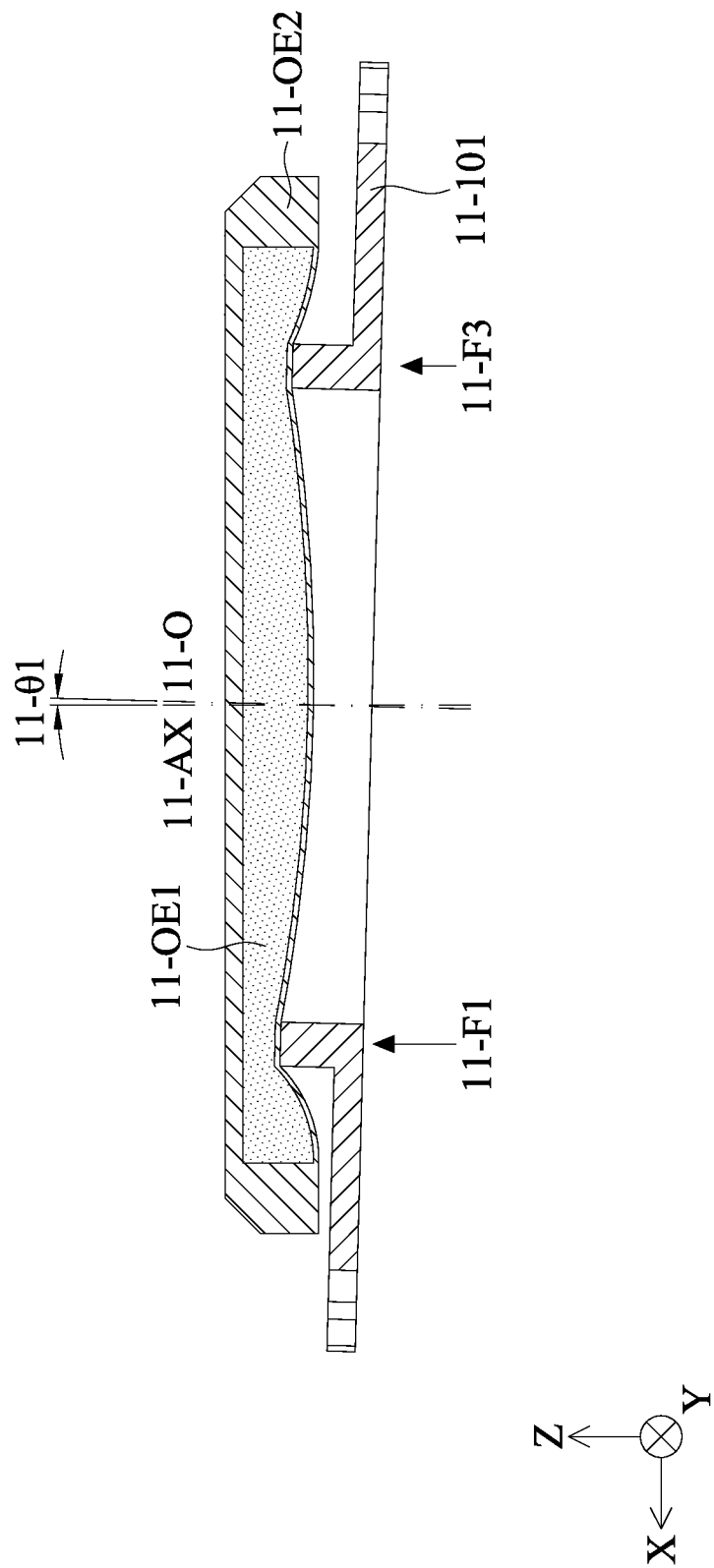

Next, please refer to FIG. 4 to FIG. 6. FIG. 4 is a schematic diagram illustrating that the first optical element 11-OE is not pushed by the deforming member 11-101 according to an embodiment of the present disclosure, and FIG. 5 and FIG. 6 are schematic diagrams of the first optical element 11-OE after being pushed by the deforming member 11-101 according to an embodiment of the present disclosure. As shown in FIG. 4, the first optical element 11-OE may be a liquid lens, including a liquid lens element 11-OE1 and a fixed member 11-OE2. The liquid lens element 11-OE1 is disposed within of the fixed member 11-OE2 having a hollow structure that protects and supports the liquid lens element 11-OE1. The deforming member 11-101 is disposed under the liquid lens element 11-OE1 and the fixed member 11-OE2. The bottom of the fixed member 11-OE2 may be a thin film, so that the deforming member 11-101 may be used for changing the shape of the liquid lens element 11-OE1.

FIG. 4 shows that the liquid lens element 11-OE1 is not deformed and the deforming member 11-101 is in an initial position, and the liquid lens element 11-OE1 has an optical axis 11-O. When the driving module 11-DM drives the movable assembly 11-MA to move, for example, applying a driving current to the driving coils of the driving module 11-DM, a magnetic force is generated between the driving coils and the corresponding magnetic elements, so that the movable assembly 11-MA is driven to move through the magnetic force and to force the deforming member 11-101 though the connecting assembly 11-CA to press the lower side of the liquid lens element 11-OE1. Therefore the liquid lens element 11-OE1 is deformed.

As shown in FIG. 2 and FIG. 5, when the first driving assembly 11-DA1 and the third driving assembly 11-DA3 of the driving module 11-DM provide pushing forces 11-F1, 11-F3 of the same magnitude, the deforming member 11-101 translates along the optical axis 11-O. At this time, the lens curvature of the liquid lens element 11-OE1 is changed from the curvature of the liquid lens element 11-OE1 in FIG. 4. That is, the shape of the liquid lens element 11-OE1 is changed. Therefore, the optical properties of the liquid lens element 11-OE1 can be changed, thereby achieving an optical zoom, focus or shock-proofing effect.

Similarly, referring to FIG. 6, when the driving module 11-DM drives the deforming member 11-101 with a tilted movement, as illustrated in FIG. 6, the deforming member 11-101 obliquely moves and provides an unequal amount of pushing forces 11-F1 and 11-F3 to two different sides of the liquid lens element 11-OE1, so that the optical axis 11-O of the liquid lens element 11-OE1 is rotated and is deviated from the main axis 11-AX. That is, there is an angle 11-θ1 formed between them. Therefore, the optical properties of the liquid lens element 11-OE1 are changed, and the optical zoom, focusing or shock-proofing effect can be accomplished.

Figure 7:
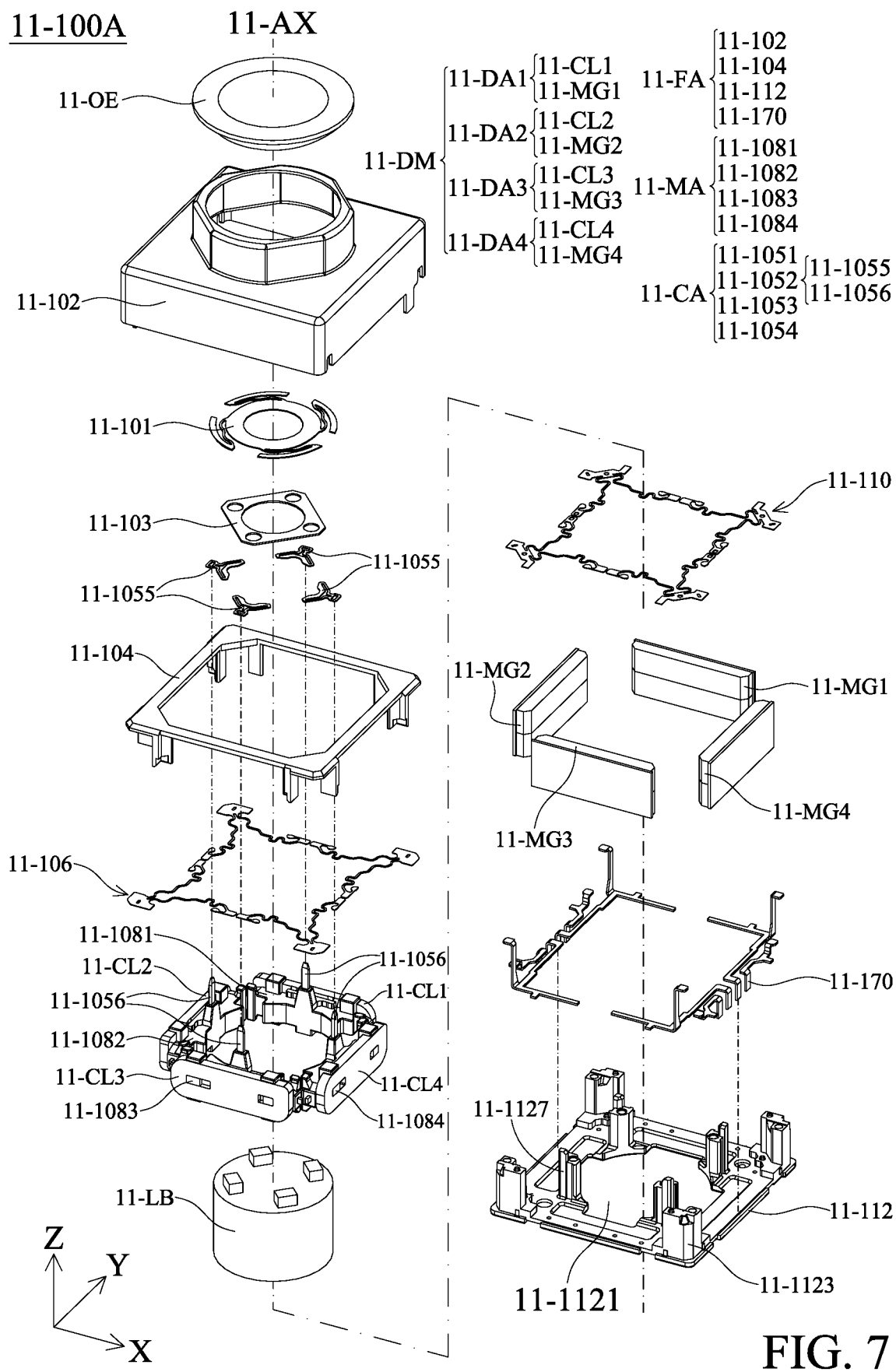
FIG. 7 is an exploded diagram of an optical system 11-100A according to another embodiment of the present disclosure.
Figure 8:
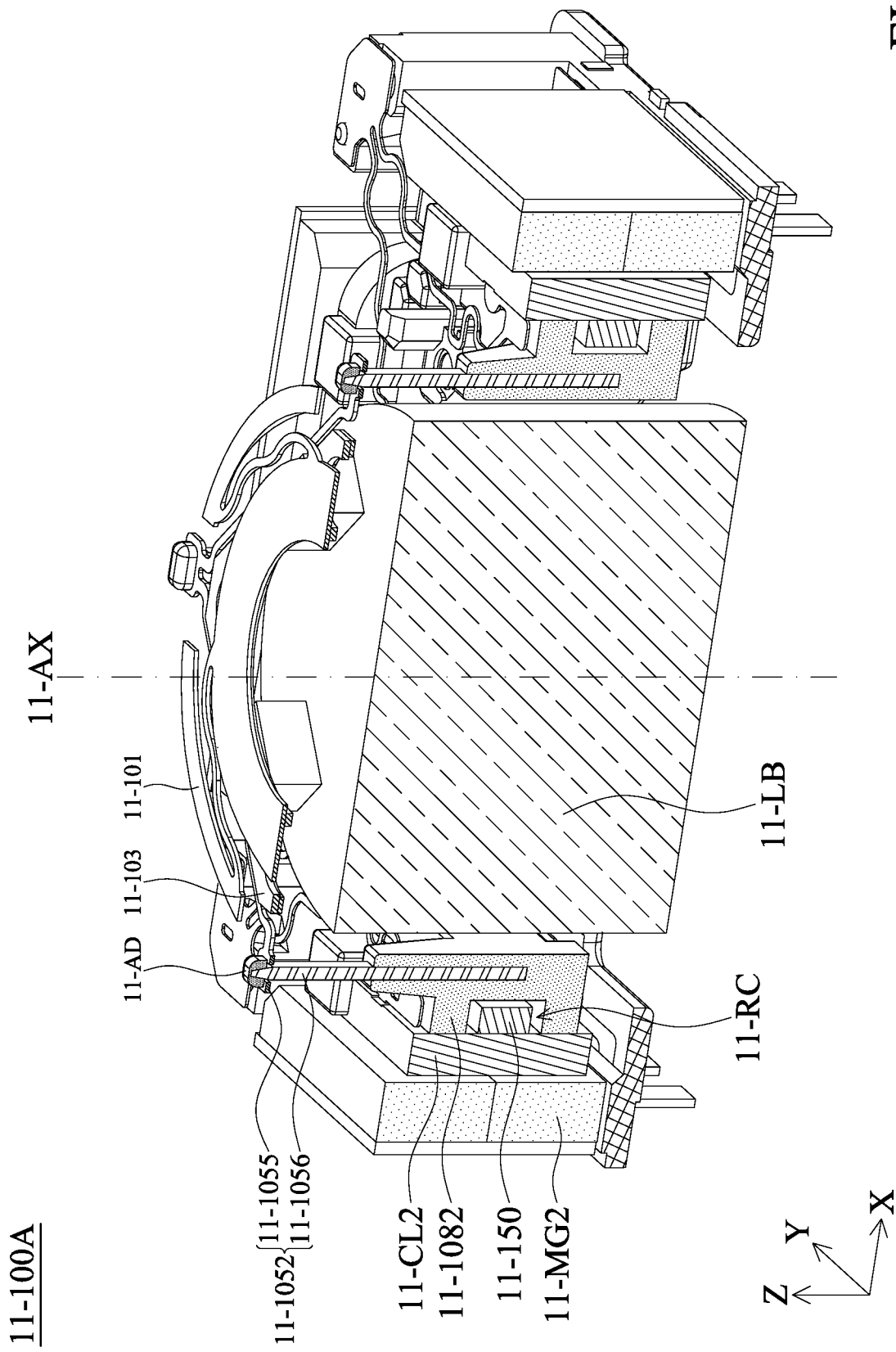
FIG. 8 is a cross-sectional view of the optical system 11-100A according to another embodiment of the present disclosure.

Please refer to FIG. 7 and FIG. 8. FIG. 7 is an exploded diagram of an optical system 11-100A according to another embodiment of the present disclosure, and FIG. 8 is a cross-sectional view of the optical system 11-100A according to another embodiment of the present disclosure. The optical system 11-100A is similar to the optical system 11-100 and may include a lens barrel 11-LB. In this embodiment, the connecting assembly 11-CA of the optical system 11-100A also includes four connecting members, and each connecting member may have an elastic portion and a rigid portion.

For example, as shown in FIG. 7 and FIG. 8, the second connecting member 11-1052 has an elastic portion 11-1055 and a rigid portion 11-1056. The elastic portion 11-1055 may have a plate-shaped structure, which is not parallel to the main axis 11-AX. For example, it may be perpendicular to the main axis 11-AX, and the rigid portion 11-1056 is connected to the elastic portion 11-1055 by the adhesive member 11-AD. The rigid portion 11-1056 is connected between the elastic portion 11-1055 and the second movable member 11-1082.

Figure 9:
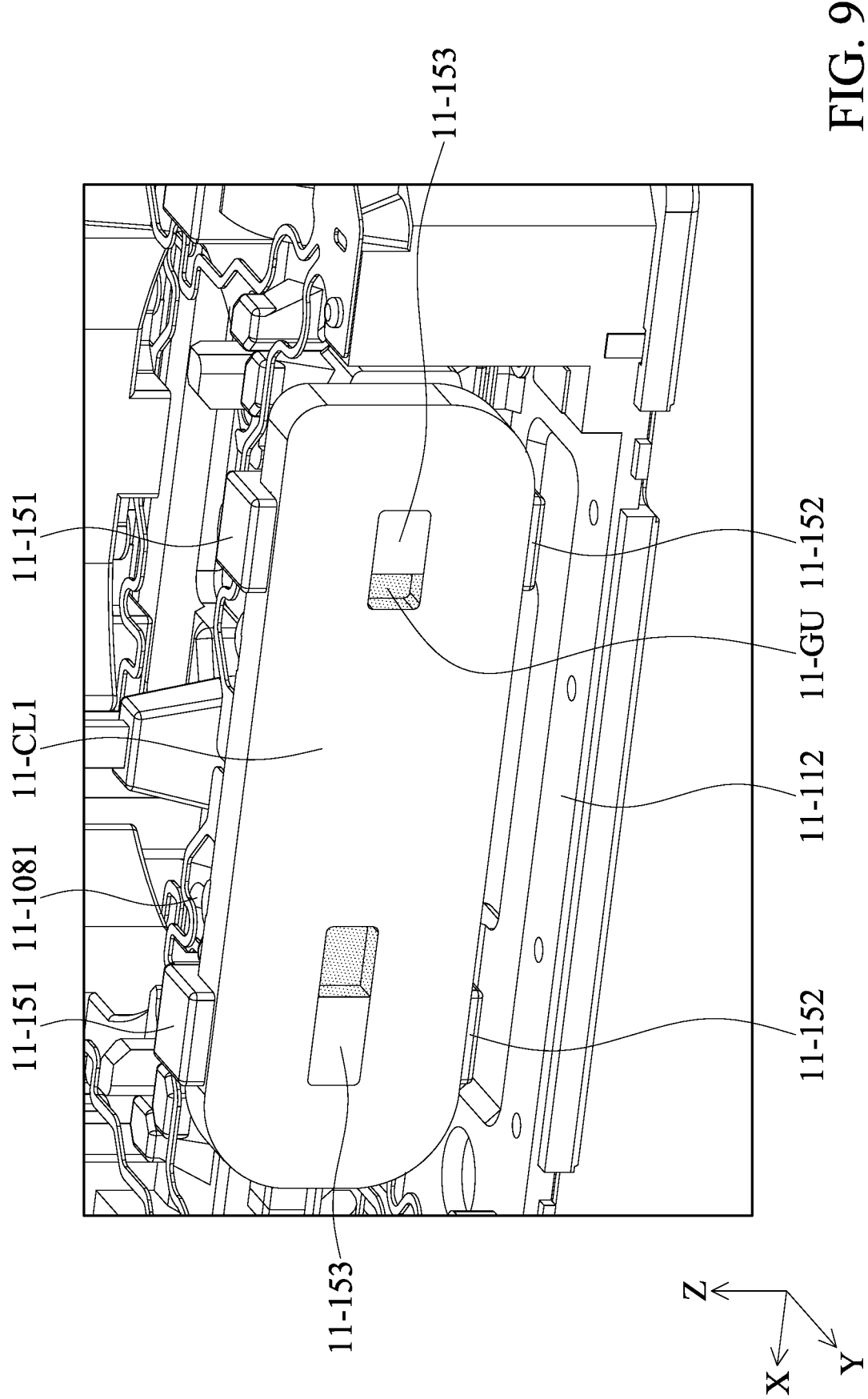
FIG. 9 is a partial structural diagram of the optical system 11-100A according to another embodiment of the present disclosure.

Please refer to FIG. 9, which is a partial structural diagram of the optical system 11-100A according to another embodiment of the present disclosure. In this embodiment, the optical system 11-100A further includes a stopping assembly, and the stopping assembly may include a plurality of stopping members, which are respectively disposed on the first movable member 11-1081 to the fourth movable member 11-1084. The aforementioned stopping assembly is used for limiting the range of motion of the movable assembly 11-MA and the movable element 11-103.

Specifically, as shown in FIG. 9, two first stopping members 11-151, two second stopping members 11-152, and two third stopping members 11-153 are disposed on the first movable member 11-1081. All of these first stopping members 11-151 are disposed on one side of the first movable member 11-1081 and face the first optical element 11-OE, and all of these second stopping members 11-152 are disposed on the other side of the first movable member 11-1081 and face the base 11-112.

In addition, as shown in FIG. 9, the first driving coil 11-CL1 surrounds the third stopping members 11-153, and the optical system 11-100A may further include at least one glue 11-GU disposed on the third stopping members 11-153, and the glue 11-GU is configured to be adhered to the first driving coil 11-CL1 and the first movable member 11-1081.

It should be noted that the second movable member 11-1082, the third movable member 11-1083, and the fourth movable member 11-1084 also have the same configuration. There are fewer than three first stopping members 11-151, fewer than three second stopping members 11-152, and fewer than three third stopping members 11-153 on each movable member of this disclosure.

Figure 10:
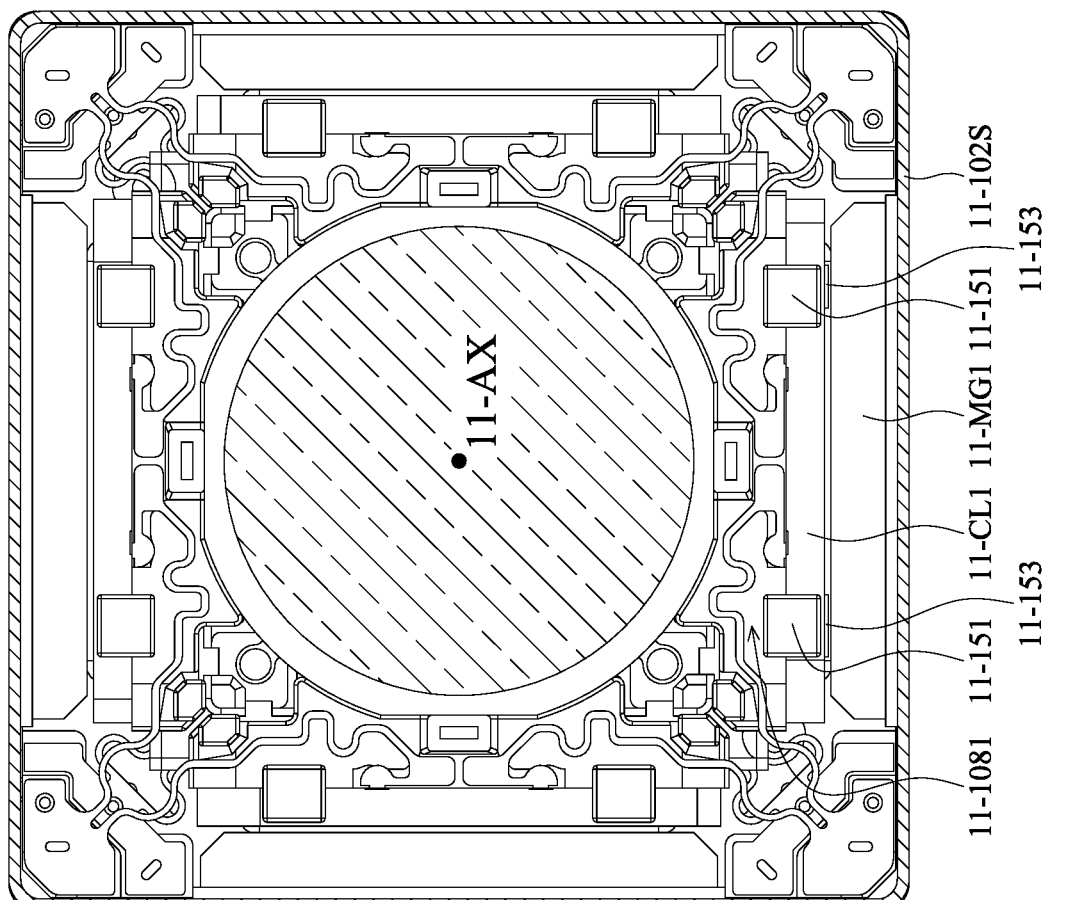
FIG. 10 is a top view of a partial structure of the optical system 11-100A according to another embodiment of the present disclosure.

Please continue to refer to FIG. 9 and FIG. 10. FIG. 10 is a top view of a partial structure of the optical system 11-100A according to another embodiment of the present disclosure. In this embodiment, the first stopping members 11-151, the two second stopping members 11-152, and the two third stopping members 11-153 on the first movable member 11-1081 only correspond to a sidewall 11-102S of the casing 11-102. That is, when viewed along the main axis 11-AX, the connecting line of the first stopping members 11-151 does not pass through the main axis 11-AX.

Furthermore, as shown in FIG. 9 and FIG. 10, when viewed along the main axis 11-AX, these first stopping members 11-151 partially overlap the first driving coil 11-CL1 of the first driving assembly 11-DA1. Similarly, the second stopping members 11-152 also partially overlap the first driving coil 11-CL1 of the first driving assembly 11-DA1.

In addition, as shown in FIG. 10, in the Y-axis (the first direction), the distance between the third stopping member 11-153 and the first magnetic element 11-MG1 (the driving magnet) is smaller than the distance between the first driving coil 11-CL1 and the first magnetic element 11-MG1. That is, the third stopping members 11-153 can be used for preventing the first driving coil 11-CL1 from colliding with the first magnetic element 11-MG1.

Figure 11:
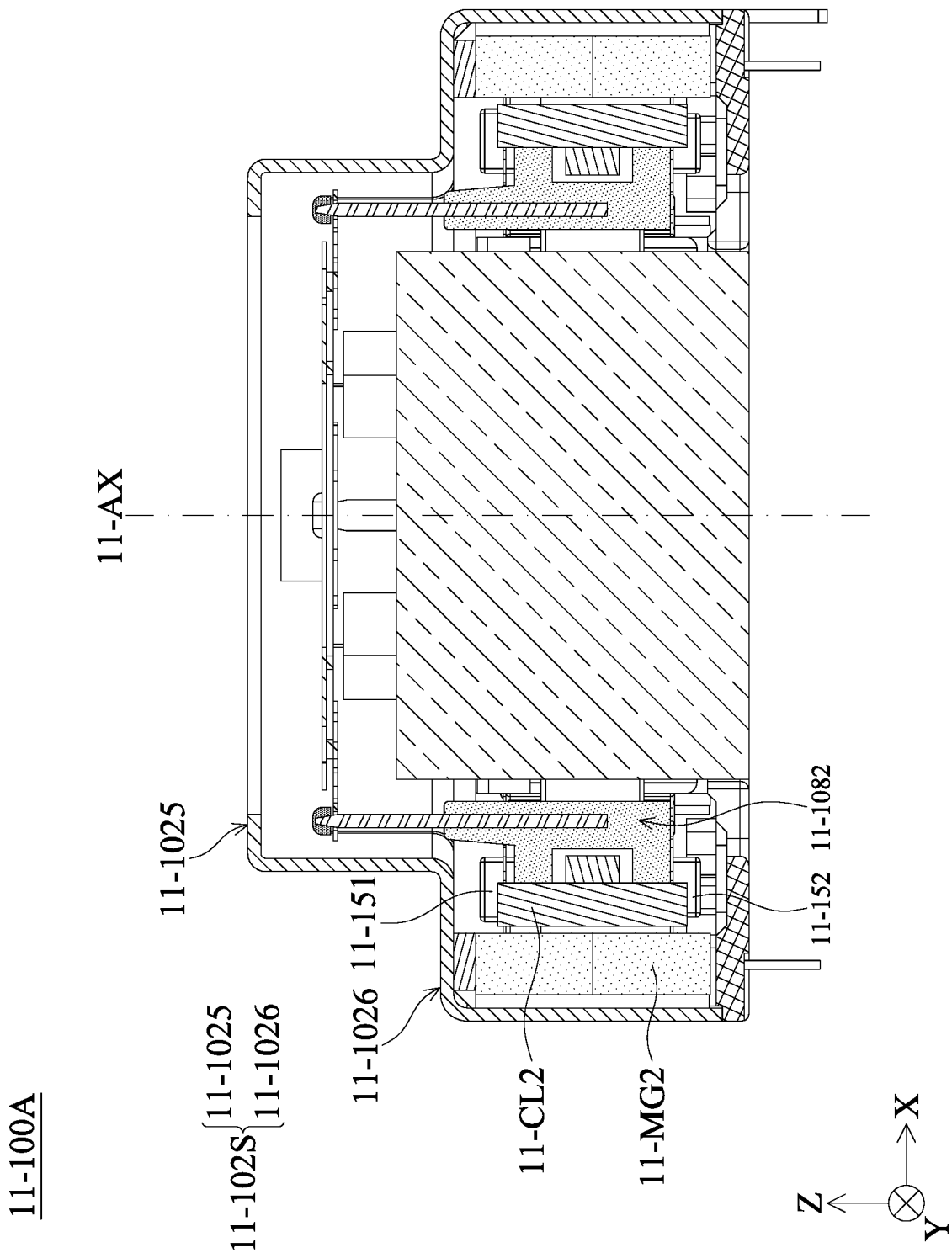
FIG. 11 is a cross-sectional view of the optical system 11-100A according to another embodiment of the present disclosure.

Next, please refer to FIG. 11, which is a cross-sectional view of the optical system 11-100A according to another embodiment of the present disclosure. As shown in FIG. 11, the sidewall 11-102S includes a first top surface 11-1025 and a second top surface 11-1026, and when viewed along the main axis 11-AX, the second top surface 11-1026 partially overlaps these first stopping members 11-151. In other embodiments, the second top surface 11-1026 may not overlap the first stopping members 11-151.

Furthermore, when viewed along the main axis 11-AX, the first top surface 11-1025 does not overlap the second magnetic element 11-MG2 and the second driving coil 11-CL2 of the second driving assembly 11-DA2.

Figure 12:
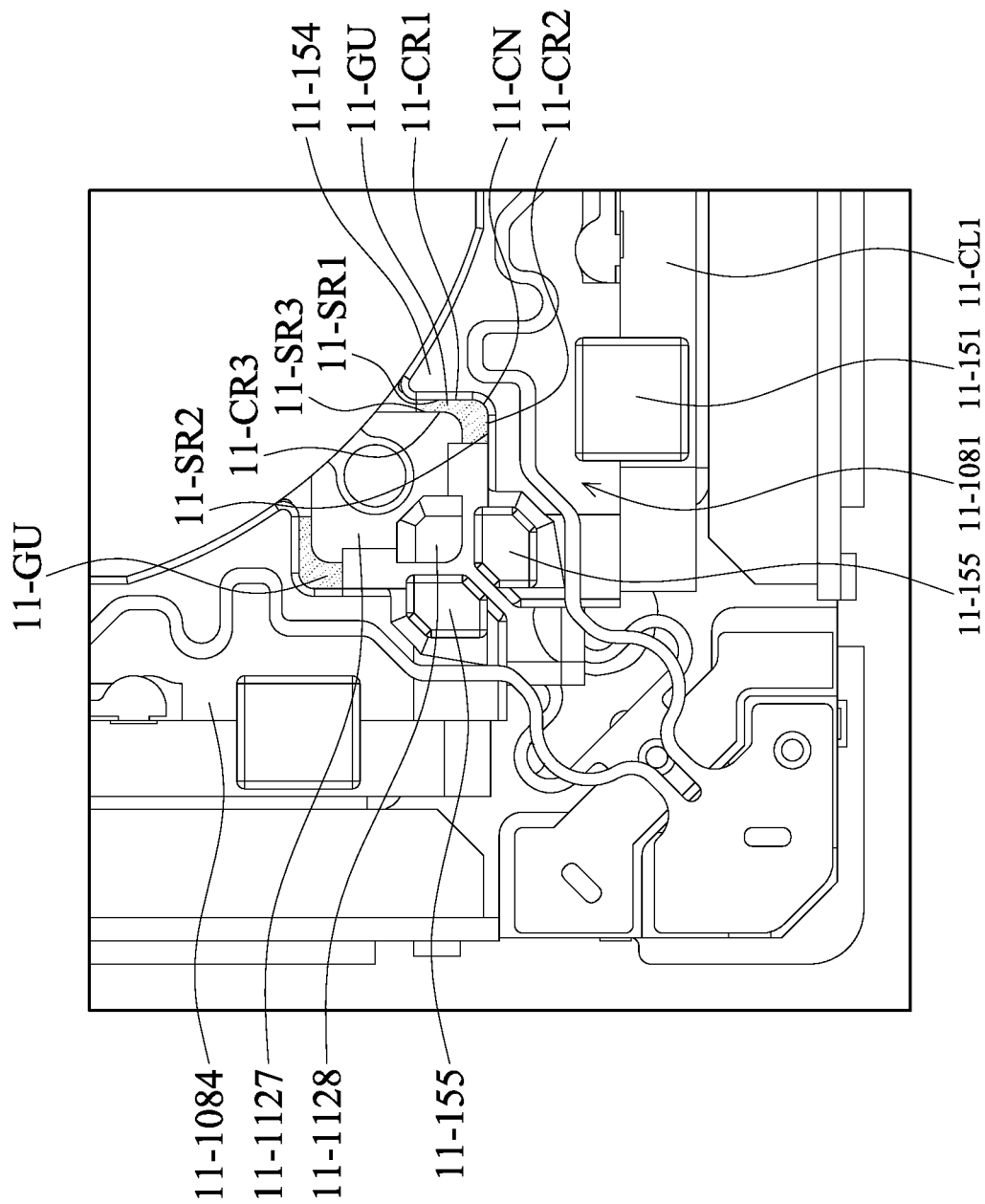
FIG. 12 is a schematic diagram of a partial structure of the optical system 11-100A according to another embodiment of the present disclosure.

Please continue to refer to FIG. 12, which is a schematic diagram of a partial structure of the optical system 11-100A according to another embodiment of the present disclosure. In this embodiment, four protruding pillars 11-1127 (FIG. 7) may be further formed on the base 11-112, and the aforementioned stopping assembly may further include a fourth stopping member 11-154 extending along the Y-axis (the first axis) and disposed on the first movable member 11-1081. The protruding pillar 11-1127 is configured to block the fourth stopping member 11-154, thereby preventing the first movable member 11-1081 of the movable assembly 11-MA from rotating around the main axis 11-AX or moving along the Y-axis (the first axis) or the X-axis (the second axis).

When viewed along the main axis 11-AX (the Z-axis), the protruding pillar 11-1127 is located between the first driving coil 11-CL1 of the first driving assembly 11-DA1 and the main axis 11-AX. In addition, the optical system 11-100A may further include glue 11-GU, which is disposed between the protruding pillar 11-1127 and the movable assembly 11-MA. As shown in FIG. 12, a piece of glue 11-GU is disposed between the protruding pillar 11-1127 and the first movable member 11-1081, and another piece of glue 11-GU is disposed between the protruding pillar 11-1127 and the fourth movable member 11-1084.

As shown in FIG. 12, the aforementioned stopping assembly may further include a fifth stopping member 11-155, which is disposed on the first movable member 11-1081 and faces the casing 11-102, and a protruding portion 11-1128 may be formed on the protruding pillar 11-1127 and is configured to block the fifth stopping member 11-155, thereby preventing the first movable member 11-1081 of the movable assembly 11-MA from rotating around the X-axis (the second axis).

Figure 13:
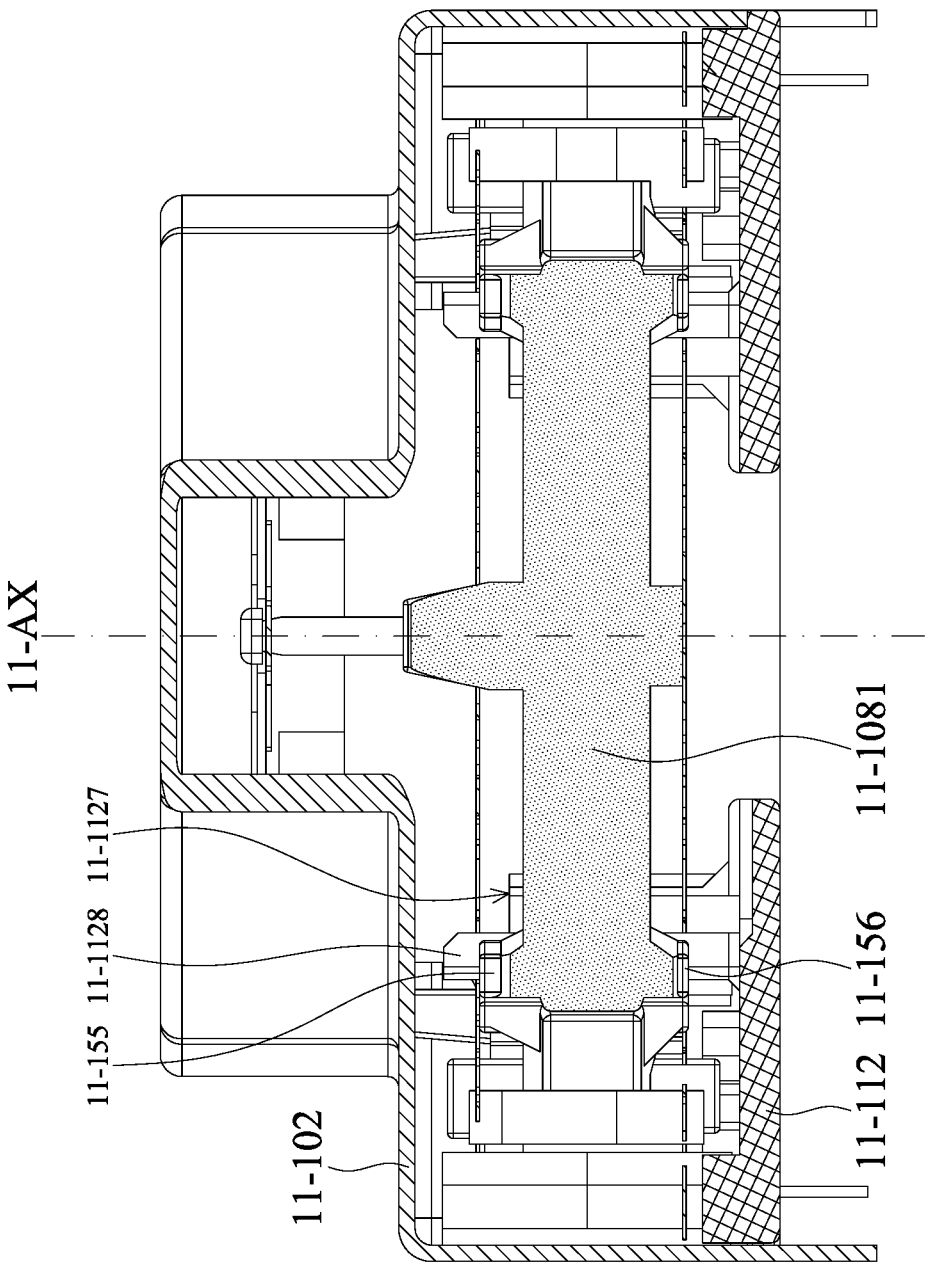
FIG. 13 is a cross-sectional view of the optical system 11-100A along the XZ plane according to an embodiment of the present disclosure.

Please refer to FIG. 12 and FIG. 13. FIG. 13 is a cross-sectional view of the optical system 11-100A along the XZ plane according to an embodiment of the present disclosure. As shown in FIG. 13, along the main axis 11-AX, the distance between the protruding portion 11-1128 and the casing 11-102 is smaller than the distance between the fifth stopping member 11-155 and the casing 11-102.

In addition, as shown in FIG. 13, the foregoing stopping assembly may further include a sixth stopping member 11-156, which is disposed on the first movable member 11-1081 and faces the base 11-112. The protruding pillar 11-1127 is configured to block the sixth stopping member 11-156, thereby preventing the first movable member 11-1081 of the movable assembly 11-MA from rotating around the X-axis (the second axis).

In this embodiment, the sixth stopping member 11-156 and the fifth stopping member 11-155 are disposed on opposite sides of the first movable member 11-1081, and when viewed along the main axis 11-AX, the fifth stopping member 11-155 partially overlaps the sixth stopping member 11-156. That is, the shapes of the fifth stopping member 11-155 and the sixth stopping member 11-156 may be different or asymmetrical.

As shown in FIG. 12, the first movable member 11-1081 has a first surface 11-SR1 and a second surface 11-SR2, the first surface 11-SR1 and the second surface 11-SR2 are connected to a corner 11-CN, a first contact surface 11-CR1 of the glue 11-GU contacts the first surface 11-SR1, and a second contact surface 11-CR2 of the glue 11-GU contacts the second surface 11-SR2. The protruding pillar 11-1127 has a third surface 11-SR3, and a third contact surface 11-CR3 of the glue 11-GU is configured to contact the third surface 11-SR3.

Figure 14:
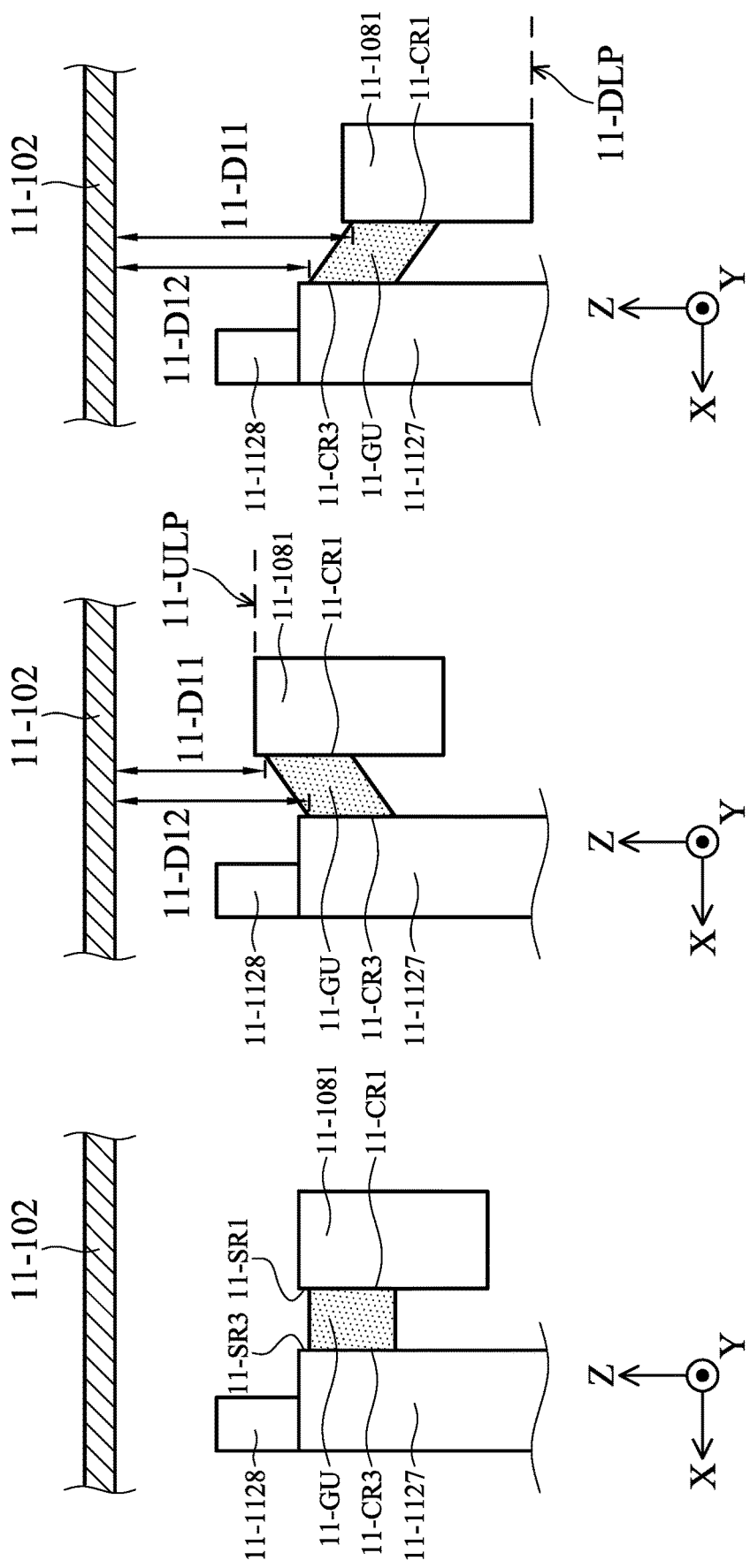
FIG. 14A to FIG. 14C are schematic diagrams of the movement of the first movable member 11-1081 relative to the protruding pillar 11-1127 according to an embodiment of the present disclosure.

Please refer to FIG. 14A to FIG. 14C, which are schematic diagrams of the movement of the first movable member 11-1081 relative to the protruding pillar 11-1127 according to an embodiment of the present disclosure. As shown in FIG. 14A, when the first movable member 11-1081 does not move relative to the protruding pillar 11-1127, the glue 11-GU does not deform. Next, as shown in FIG. 14B and FIG. 14C, the first movable member 11-1081 of the movable assembly 11-MA is configured to move between an upper limit position 11-ULP and a lower limit position 11-DLP along the main axis 11-AX (the Z-axis), and the glue 11-GU is disposed between the upper limit position 11-ULP and the lower limit position 11-DLP. For example, the glue 11-GU can be disposed at the center of the upper limit position 11-ULP and the lower limit position 11-DLP, but it is not limited thereto.

Furthermore, as shown in FIG. 14B, when the first movable member 11-1081 of the movable assembly 11-MA is located at the upper limit position 11-ULP, the glue 11-GU is deformed, and the distance D11 along the main axis 11-AX between the first contact surface 11-CR1 and the casing 11-102 is less than the distance D12 between the third contact surface 11-CR3 and the casing 11-102.

Furthermore, as shown in FIG. 14C, when the first movable member 11-1081 of the movable assembly 11-MA is located at the lower limit position 11-DLP, the glue 11-GU is deformed, and the distance D11 along the main axis 11-AX between the first contact surface 11-CR1 and the casing 11-102 is greater than the distance D12 between the third contact surface 11-CR3 and the casing 11-102.

Figure 15:
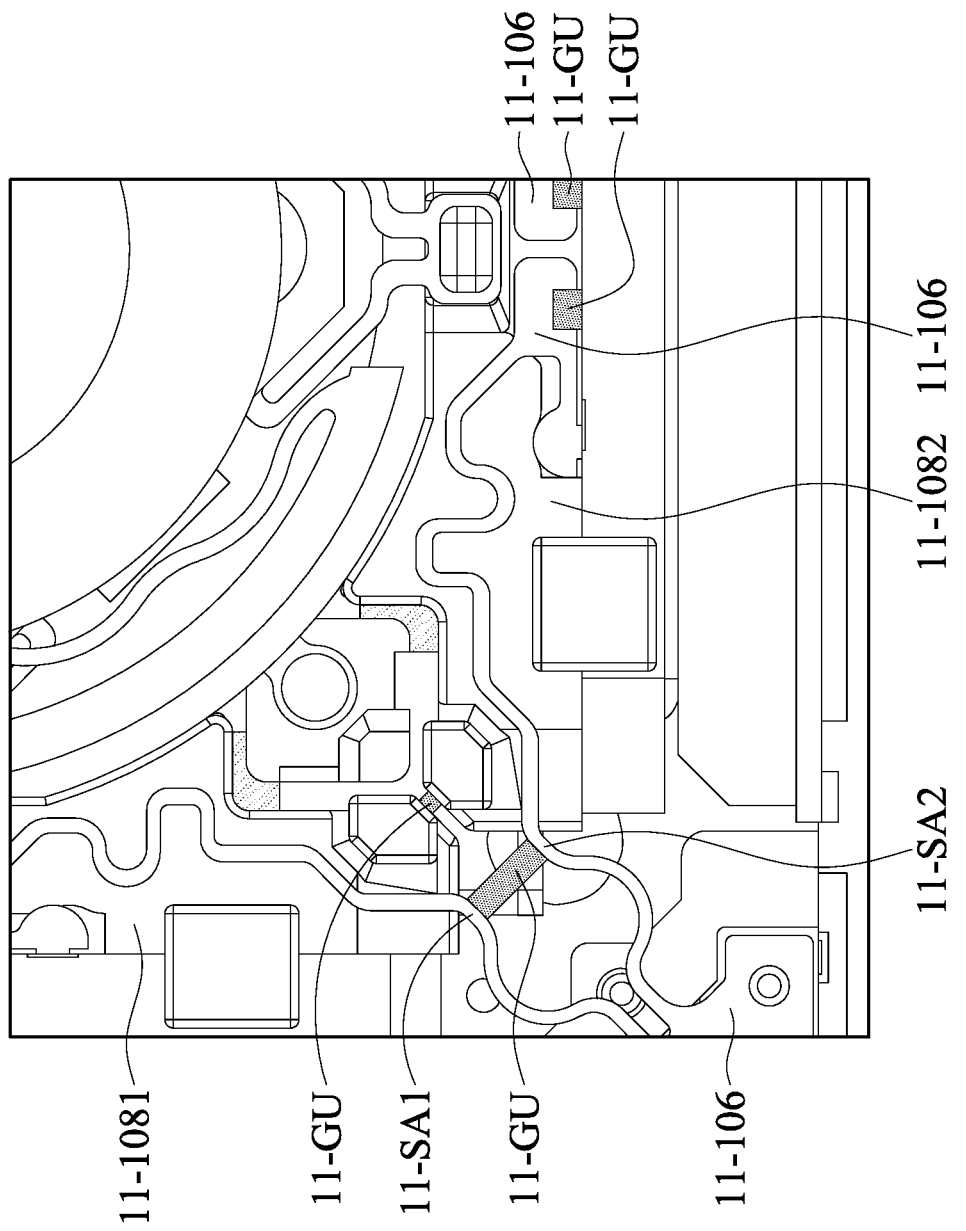
FIG. 15 is a top view of a part of the structure of the optical system 11-100A according to another embodiment of the present disclosure.

Please continue to refer to FIG. 15, which is a top view of a part of the structure of the optical system 11-100A according to another embodiment of the present disclosure. As shown in FIG. 15, the first movable member 11-1081 is disposed along the X-axis (the second axis), and the second movable member 11-1082 is disposed along the Y-axis (the first axis). The second movable member 11-1082 is adjacent to the first movable member 11-1081, and the second movable member 11-1082 is configured to block the first movable member 11-1081 from moving along the X-axis or the Y-axis.

Furthermore, the optical system 11-100A further includes one or more pieces of glue 11-GU, which are disposed between the first movable member 11-1081 and the second movable member 11-1082. As shown in FIG. 15, by disposing the glue 11-GU, the first movable member 11-1081 can be prevented from directly colliding with the second movable member 11-1082 to cause damage.

As shown in FIG. 15, the first elastic element 11-106 includes a first string arm 11-SA1 and a second string arm 11-SA2, which are respectively connected to the first movable member 11-1081 and the second movable member 11-1082, and the glue 11-GU can also be disposed between the first string arm 11-SA1 and the second string arm 11-SA2 for preventing the first string arm 11-SA1 from colliding with the second string arm 11-SA2 to cause damage.

In addition, in this embodiment, the glue 11-GU may also be disposed between the elastic element and the movable assembly 11-MA. As shown in FIG. 15, the glue 11-GU is disposed between the first elastic element 11-106 and the second movable member 11-1082.

Figure 16:
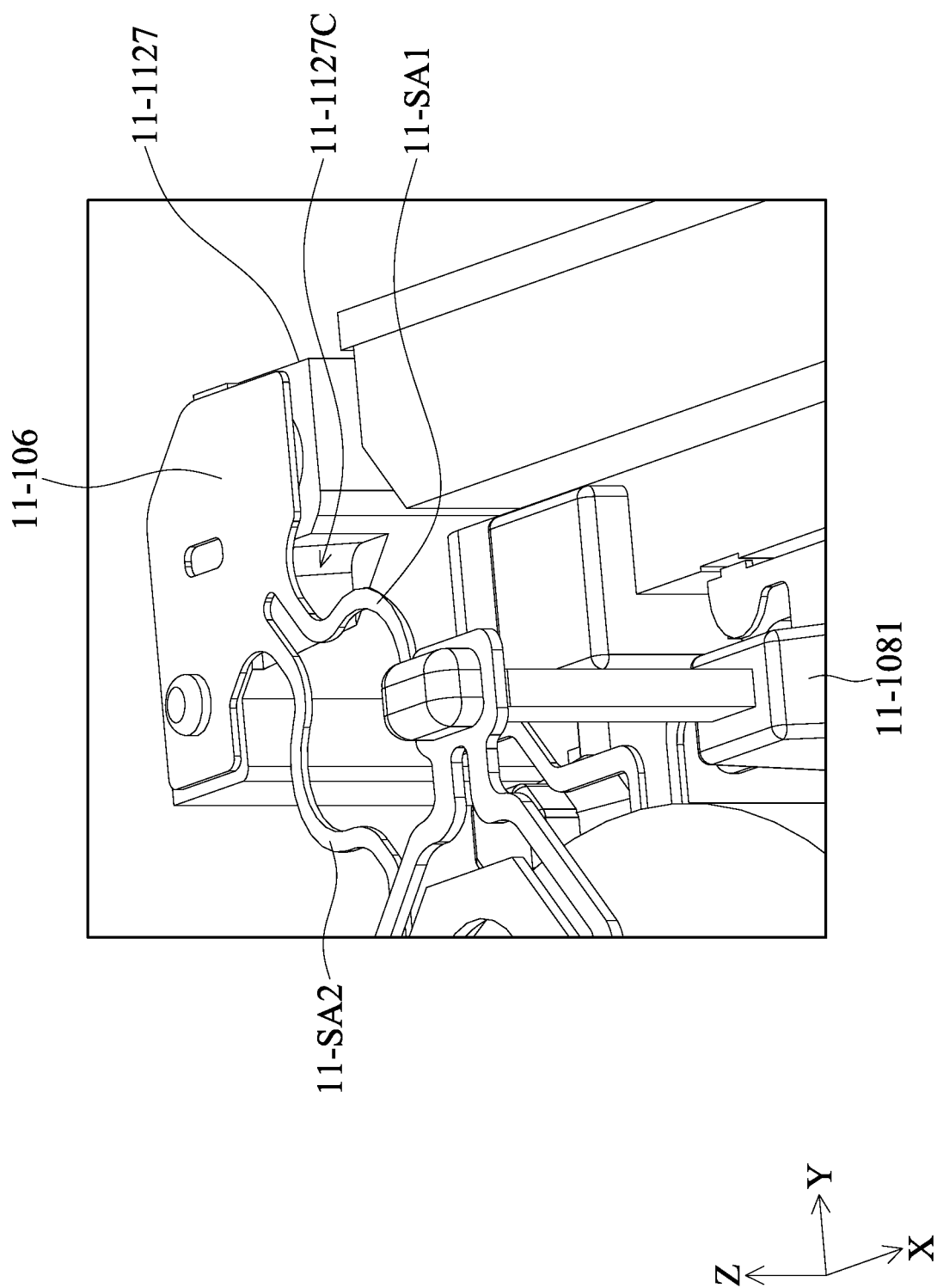
FIG. 16 is a partial structural diagram of the optical system 11-100A according to another embodiment of the present disclosure.

Please refer to FIG. 16, which is a partial structural diagram of the optical system 11-100A according to another embodiment of the present disclosure. In this embodiment, an avoiding groove 11-1127C corresponding to the first string arm 11-SA1 and the second string arm 11-SA2 is formed on the protruding pillar 11-1127. By disposing the avoiding groove 11-1127C, the first string arm 11-SA1 and the second string arm 11-SA2 can be prevented from directly colliding with the protruding pillar 11-1127 to cause damage.

Figure 17:
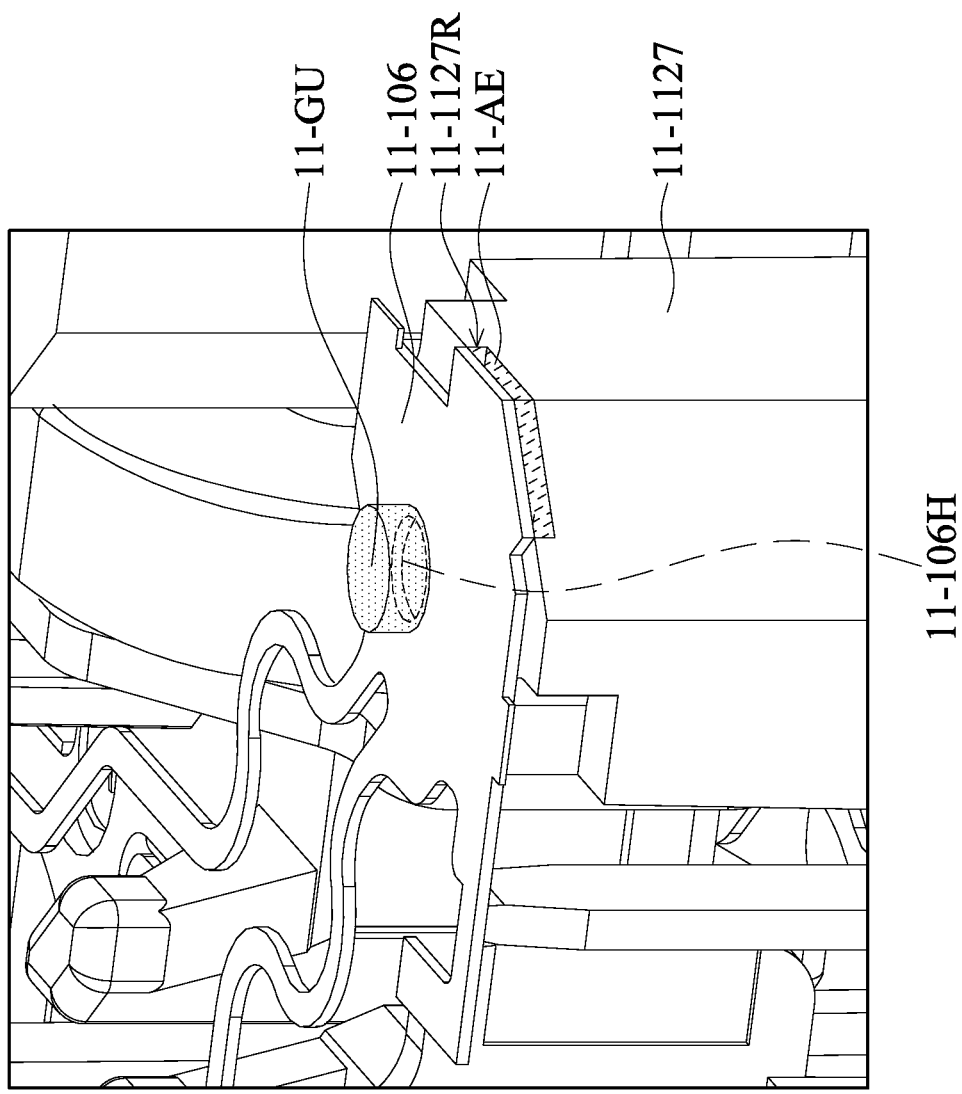
FIG. 17 is a schematic structural diagram of a part of the optical system 11-100A according to another embodiment of the present disclosure.

Please refer to FIG. 17, which is a schematic structural diagram of a part of the optical system 11-100A according to another embodiment of the present disclosure. The protruding pillars 11-1127 of the present disclosure may have different designs. In this embodiment, a receiving groove 11-1127R may be formed on the protruding pillar 11-1127 in further, and the optical system 11-100A may further include an adhesive element 11-AE which is disposed in the receiving groove 11-1127R and is configured to be adhered to the protruding pillar 11-1127, the first elastic element 11-106, and the casing 11-102.

In addition, in this embodiment, the optical system 11-100A may further include another piece of glue 11-GU, which is disposed between the elastic element and the fixed assembly 11-FA. Specifically, as shown in FIG. 17, the first elastic element 11-106 may have a perforation 11-106H, and the glue 11-GU may be disposed between the first elastic element 11-106 and the protruding pillar 11-1127 through the perforation 11-106H.

The present disclosure provides an optical system having a first optical element 11-OE, a deforming member 11-101, a movable element 11-103, a fixed assembly 11-FA, a connecting assembly 11-CA, a movable assembly 11-MA, and a driving module 11-DM. The movable element 11-103 is configured to be connected to the first optical element 11-OE through the deforming member 11-101, and the movable assembly 11-MA is connected to the movable element 11-103 through the connecting assembly 11-CA. When driving module 11-DM is configured to drive movable assembly 11-MA to move relative to fixed assembly 11-FA, the movable element 11-103 can be moved to drive the deforming member 11-101 to push the bottom of first optical element 11-OE, thereby changing the optical properties of the liquid lens element 11-OE1.

In addition, the optical system of the present disclosure may include a plurality of pieces of glue 11-GU, and the glue 11-GU may serve as a buffering element, disposed between a stopping member and a driving coil, between two adjacent movable members, between a movable member and the protruding column 11-1127, between the elastic element and the movable assembly 11-MA, or between the elastic element and the fixed assembly 11-FA, so as to prevent the elements in the optical system from the damage caused by collision.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a fixed assembly, defining a main axis;
a movable element, movable relative to the fixed assembly and connected to a first optical element;
a movable assembly, connected the movable element;
a driving module, configured to drive the movable assembly so as to drive the movable element to move relative to the fixed assembly; and
a stopping assembly, configured to limit a range of motion of the movable assembly;
wherein the first optical element is a liquid lens;
wherein the optical system further comprises a deforming member and a connecting assembly;
wherein the movable element is configured to be connected to the first optical element through the deforming member, and the movable assembly is connected to the movable element through the connecting assembly;
wherein when driving module is configured to drive the movable assembly to move relative to fixed assembly, the movable element is movable to drive the deforming member to push the bottom of first optical element, thereby changing the optical properties of the liquid lens;
wherein the stopping assembly includes a plurality of first stopping members, the movable assembly includes a first movable member, and less than three of the first stopping members are protruded along the main axis and are disposed on the first movable member;
wherein when viewed along the main axis, the first stopping members partially overlap the driving module;
wherein the fixed assembly includes a casing, and the first stopping members only correspond to a sidewall of the casing;
wherein the fixed assembly includes a base, the stopping assembly further includes a plurality of second stopping members, and less than three of the second stopping members are disposed on a side of the movable assembly and face the base;
wherein the stopping assembly further includes a third stopping member, disposed on the movable assembly, the driving module includes a driving magnet and a driving coil corresponding to the driving magnet, the driving coil surrounds the third stopping member, wherein a distance between the third stopping member and the driving magnet in a first direction is smaller than a distance between the driving coil and the driving magnet.

2. The optical system as claimed in claim 1, wherein when viewed along the main axis, the sidewall does not overlap the first stopping members.

3. The optical system as claimed in claim 1, wherein the optical system further includes glue disposed on the third stopping member, and the glue is configured to be adhered to the driving coil and the movable assembly.

4. The optical system as claimed in claim 1, wherein a protruding pillar is formed on the base, the stopping assembly further includes a fourth stopping member extending along a first axis and disposed on the movable assembly, and the protruding pillar is configured to block the fourth stopping member, thereby preventing the movable assembly from rotating around the main axis or moving along the first axis or a second axis.

5. The optical system as claimed in claim 4, wherein when viewed along the main axis, the protruding pillar is located between the driving module and the main axis.

6. The optical system as claimed in claim 4, wherein the optical system further includes glue which is disposed between the protruding pillar and the movable assembly.

7. The optical system as claimed in claim 6, wherein the movable assembly has a first surface and a second surface, the first surface and the second surface are connected to a corner, a first contact surface of the glue contacts the first surface, and a second contact surface of the glue contacts the second surface.

8. The optical system as claimed in claim 6, wherein the movable assembly has a first surface, the protruding pillar has a third surface, a first contact surface of the glue contacts the first surface, and a third contact surface of the glue is configured to contact the third surface, wherein the movable assembly is configured to move between an upper limit position and a lower limit position along the main axis, and the glue is disposed between the upper limit position and the lower limit position.

9. The optical system as claimed in claim 8, wherein when the movable assembly is located at the upper limit position, a distance between the first contact surface and the casing along the main axis is less than a distance between the third contact surface and the casing along the main axis.

10. The optical system as claimed in claim 8, wherein when the movable assembly is located at the lower limit position, a distance between the first contact surface and the casing along the main axis is less than a distance between the third contact surface and the casing along the main axis.

11. The optical system as claimed in claim 4, wherein the stopping assembly further includes a fifth stopping member, which is disposed on the movable assembly and faces the casing, and a protruding portion is formed on the protruding pillar and is configured to block the fifth stopping member, thereby preventing the movable assembly from rotating around the second axis.

12. The optical system as claimed in claim 11, wherein a distance between the protruding portion and the casing along the main axis is smaller than a distance between the fifth stopping member and the casing.

13. The optical system as claimed in claim 12, wherein the stopping assembly further includes a sixth stopping member, which is disposed on the movable assembly and faces the base, and the protruding pillar is configured to block the sixth stopping member, thereby preventing the movable assembly from rotating around the second axis.

14. The optical system as claimed in claim 13, wherein when viewed along the main axis, the fifth stopping member partially overlaps the sixth stopping member.

15. The optical system as claimed in claim 13, wherein the casing has a first top surface, and when viewed along the main axis, the first top surface does not overlap the driving module.

16. The optical system as claimed in claim 1, wherein the movable assembly includes:
the first movable member, disposed along a second axis; and
a second movable member, disposed along a first axis, wherein the second movable member is adjacent to the first movable member, and the second movable member is configured to block the first movable member from moving along the first axis.

17. The optical system as claimed in claim 16, wherein the optical system further includes a plurality of pieces of glue, which are disposed between the first movable member and the second movable member.

18. The optical system as claimed in claim 16, wherein the optical system further includes an elastic element and at least one piece of glue, the elastic element is connected to the fixed assembly, the elastic element includes a first string arm and a second string arm, which are respectively connected to the first movable member and the second movable member, and the at least one piece of glue is disposed between the first string arm and the second string arm.

19. The optical system as claimed in claim 18, wherein the fixed assembly includes a protruding pillar, and an avoiding groove corresponding to the first string arm and the second string arm is formed on the protruding pillar.

20. The optical system as claimed in claim 19, wherein a receiving groove is formed on the protruding pillar, and the optical system further includes an adhesive element which is disposed in the receiving groove and is configured to be adhered to the protruding pillar, the elastic element and the casing.

21. The optical system as claimed in claim 1, wherein the optical system further includes an elastic element and a piece of glue, and the glue is disposed between the elastic element and the movable assembly.

22. The optical system as claimed in claim 21, wherein the optical system further includes another piece of glue, which is disposed between the elastic element and the fixed assembly.

23. An optical system, comprising:
a fixed assembly, defining a main axis;
a movable element, movable relative to the fixed assembly and connected to a first optical element;
a movable assembly, connected the movable element;
a driving module, configured to drive the movable assembly so as to drive the movable element to move relative to the fixed assembly; and
a stopping assembly, configured to limit a range of motion of the movable assembly;
wherein the first optical element is a liquid lens;
wherein the optical system further comprises a deforming member and a connecting assembly;
wherein the movable element is configured to be connected to the first optical element through the deforming member, and the movable assembly is connected to the movable element through the connecting assembly;
wherein when driving module is configured to drive the movable assembly to move relative to fixed assembly, the movable element is movable to drive the deforming member to push the bottom of first optical element, thereby changing the optical properties of the liquid lens;
wherein the stopping assembly includes a plurality of first stopping members, the movable assembly includes a first movable member, and less than three of the first stopping members are protruded along the main axis and are disposed on the first movable member;
wherein when viewed along the main axis, the first stopping members partially overlap the driving module;
wherein the fixed assembly includes a casing, and the first stopping members only correspond to a sidewall of the casing;
wherein the fixed assembly includes a base, the stopping assembly further includes a plurality of second stopping members, and less than three of the second stopping members are disposed on a side of the movable assembly and face the base;
wherein a protruding pillar is formed on the base, the stopping assembly further includes a fourth stopping member extending along a first axis and disposed on the movable assembly, and the protruding pillar is configured to block the fourth stopping member, thereby preventing the movable assembly from rotating around the main axis or moving along the first axis or a second axis.

24. An optical system, comprising:
a fixed assembly, defining a main axis;
a movable element, movable relative to the fixed assembly and connected to a first optical element;
a movable assembly, connected the movable element;
a driving module, configured to drive the movable assembly so as to drive the movable element to move relative to the fixed assembly; and
a stopping assembly, configured to limit a range of motion of the movable assembly;
wherein the first optical element is a liquid lens;
wherein the optical system further comprises a deforming member and a connecting assembly;
wherein the movable element is configured to be connected to the first optical element through the deforming member, and the movable assembly is connected to the movable element through the connecting assembly;
wherein when driving module is configured to drive the movable assembly to move relative to fixed assembly, the movable element is movable to drive the deforming member to push the bottom of first optical element, thereby changing the optical properties of the liquid lens;
wherein the stopping assembly includes a plurality of first stopping members, the movable assembly includes a first movable member, and less than three of the first stopping members are protruded along the main axis and are disposed on the first movable member;
wherein when viewed along the main axis, the first stopping members partially overlap the driving module;
wherein the movable assembly includes:
the first movable member, disposed along a second axis; and
a second movable member, disposed along a first axis, wherein the second movable member is adjacent to the first movable member, and the second movable member is configured to block the first movable member from moving along the first axis;
wherein the optical system further includes an elastic element and at least one piece of glue, the elastic element is connected to the fixed assembly, the elastic element includes a first string arm and a second string arm, which are respectively connected to the first movable member and the second movable member, and the at least one piece of glue is disposed between the first string arm and the second string arm;

wherein the fixed assembly includes a protruding pillar, and an avoiding groove corresponding to the first string arm and the second string arm is formed on the protruding pillar.

* * * * *